United States Patent [19]
Brown

[11] Patent Number: 5,720,992
[45] Date of Patent: Feb. 24, 1998

[54] MOVABLE EXTRACTOR PLATE ASSEMBLY FOR RAPIDLY REMOVING ARTICLES FROM A THERMOFORMING APPARATUS

[75] Inventor: Gaylord Brown, Punta Gorda, Fla.

[73] Assignee: Trafalgar House Company, South Attelboro, Mass.

[21] Appl. No.: 545,091

[22] Filed: Oct. 19, 1995

[51] Int. Cl.$^6$ ................................................ B29C 51/10
[52] U.S. Cl. ................. 425/388; 425/403.1; 425/437; 425/DIG. 60
[58] Field of Search .................... 425/388, 403.1, 425/437, DIG. 60

[56] References Cited

U.S. PATENT DOCUMENTS

| | | | |
|---|---|---|---|
| 3,161,915 | 12/1964 | Thiel | 425/305.1 |
| 3,773,457 | 11/1973 | Badoux et al. | 425/388 |
| 3,867,088 | 2/1975 | Brown et al. | 425/388 |
| 4,560,339 | 12/1985 | Padovani | 425/437 |
| 4,872,826 | 10/1989 | Padovani | 425/388 |
| 5,308,237 | 5/1994 | Kieran | 425/437 |
| 5,453,237 | 9/1995 | Padovani | 425/388 |
| 5,591,463 | 1/1997 | Padovani | 425/403.1 |

*Primary Examiner*—Jay H. Woo
*Assistant Examiner*—Iurie A. Schwartz
*Attorney, Agent, or Firm*—Breiner & Breiner

[57] ABSTRACT

A thermoforming apparatus having a plurality of dies for forming a plurality of thin walled plastic articles in combination with an improved movable extractor plate assembly for moving an extractor plate between the plurality of dies of the thermoforming apparatus to remove formed articles is described. The movable extractor plate assembly includes an extractor plate having a vacuum chamber connected to the outlet end of a vacuum source and having at the inlet end of the vacuum source a pressure control valve and a vent valve between the vacuum source and pressure control valve. The assembly permits the control of pressure to the vacuum chamber to provide holding contact of articles formed onto the extractor plate without deformation of the thin walled articles. Additionally, the assembly permits the injection of air pressure into the vacuum chamber upon closing of the vacuum source to facilitate release of the formed articles from the extractor plate.

3 Claims, 4 Drawing Sheets

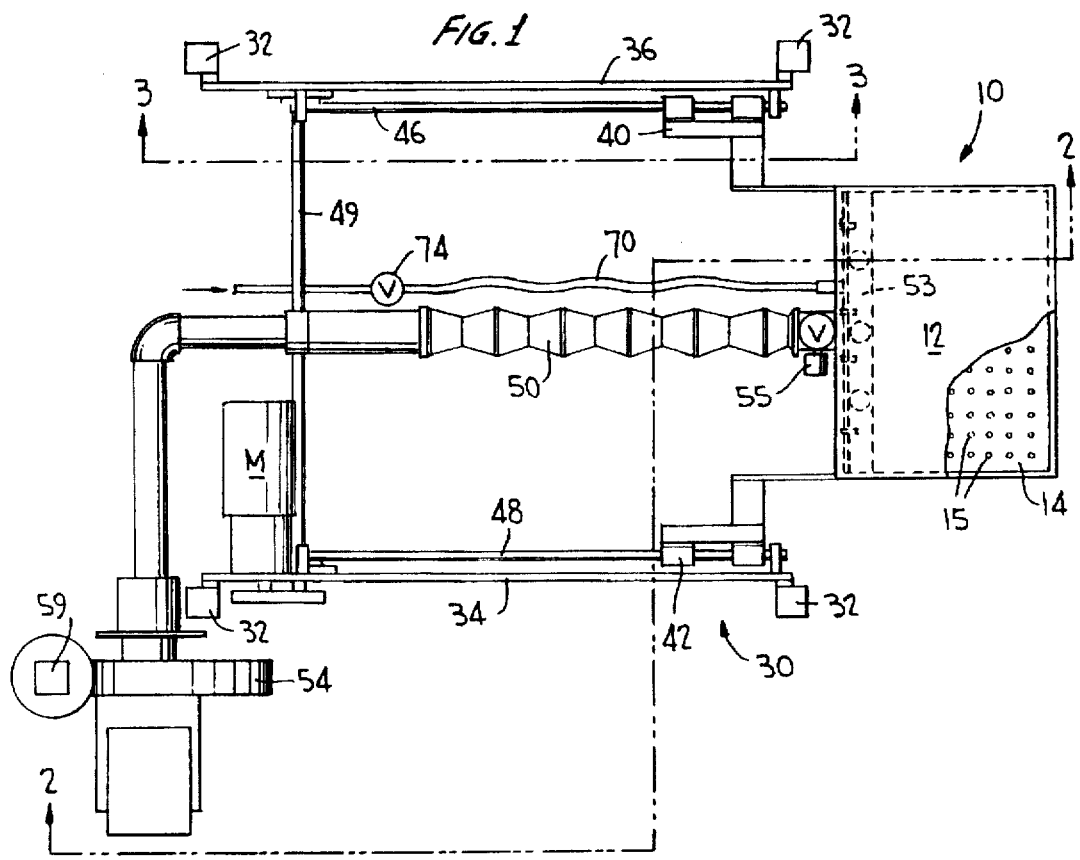
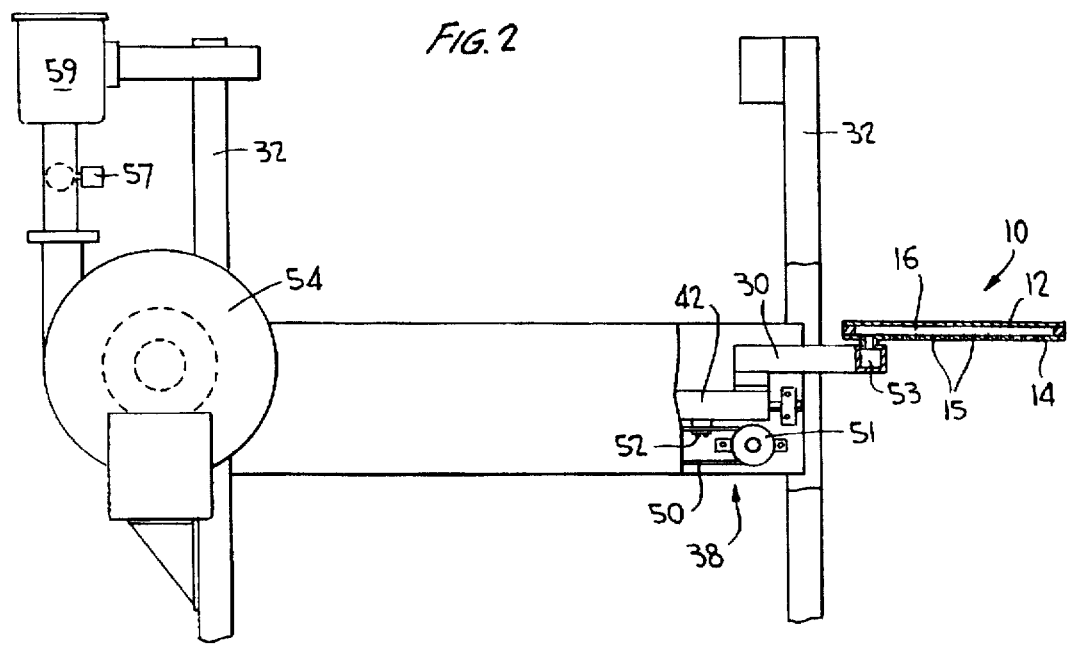

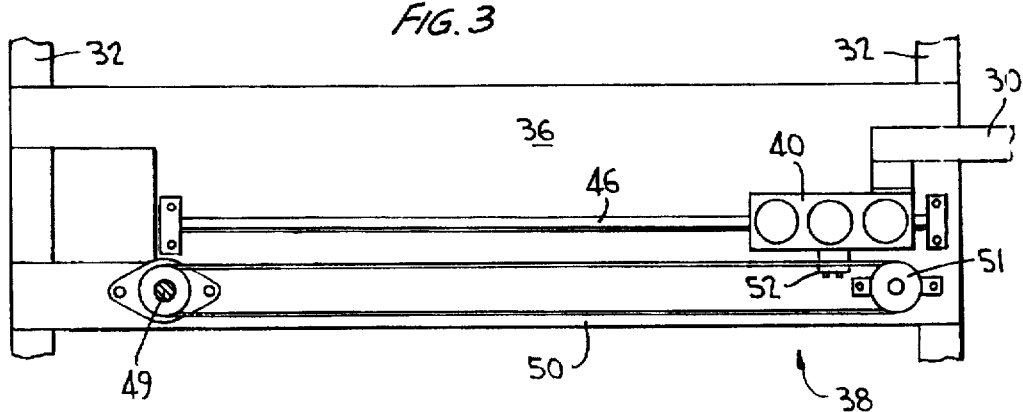
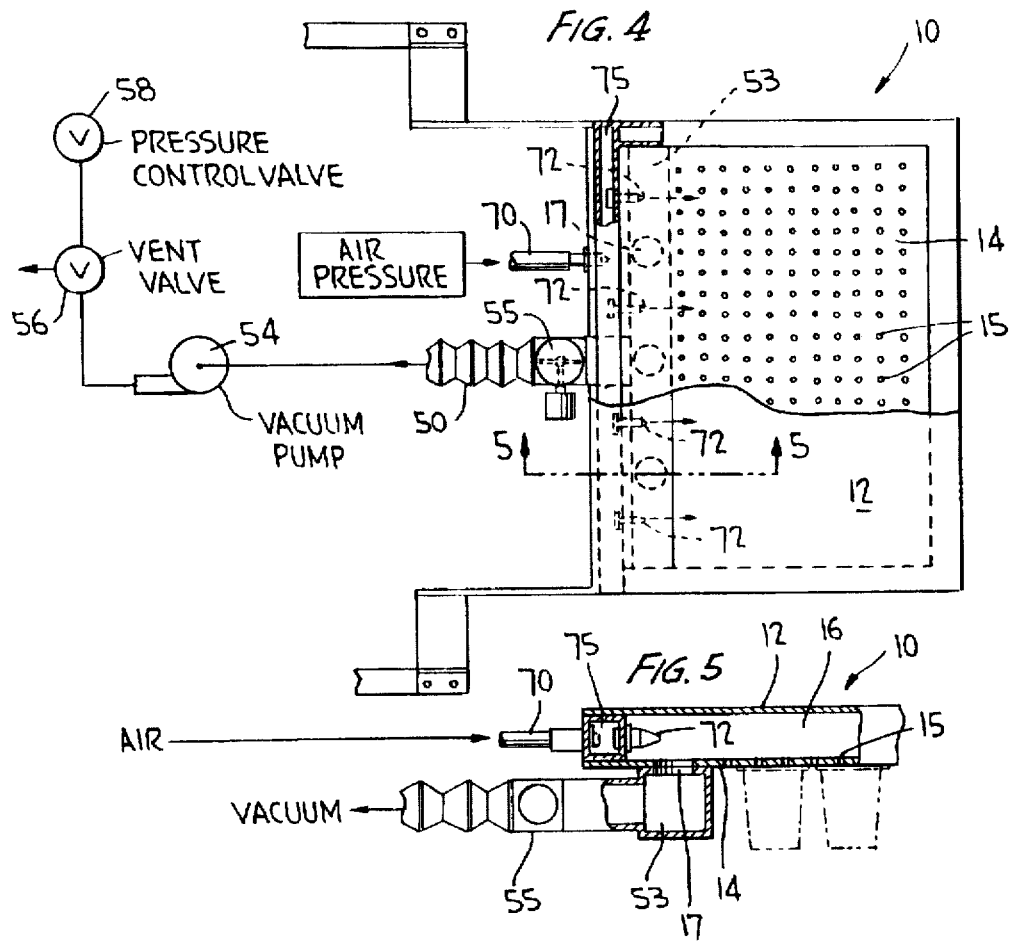

FIG. 10
SEQUENCE OF OPERATION - CONTROLLED BY PLC COMPUTER

| # | OPERATION |
|---|---|
| 1 | SHEET INDEX |
| 2 | MOLD UP (LOWER PLATEN) |
| 3 | PLUG DOWN (UPPER PLATEN) |
| 4 | BLOW FORM |
| 5 | TRIM DOWN |
| 6 | TRIM UP |
| 7 | PLUG UP |
| 8 | MOLD DOWN #1 |
| 9 | VACUUM PLATE IN (ABOVE MOLD) |
| 10 | VACUUM VALVE #1 (ADJUSTABLE CLOSE) |
| 11 | PART EJECT (TO VACUUM PLATE) |
| 12 | MOLD DOWN #2 |
| 13 | VACUUM PLATE OUT |
| 14 | VACUUM VALVE #2 (FULL CLOSE) |
| 15 | EJECTION AIR ON |
| 16 | EJECTION AIR OFF |
| 17 | VACUUM VALVE OPEN (66) |

1

MOVABLE EXTRACTOR PLATE ASSEMBLY FOR RAPIDLY REMOVING ARTICLES FROM A THERMOFORMING APPARATUS

FIELD OF INVENTION

The present invention relates to an apparatus for the production of thin walled plastic articles in a thermoforming machine. More particularly, the invention relates to a movable extractor plate assembly for rapidly engaging and removing articles formed in a thermoforming apparatus and to a method of extracting formed articles from the thermoforming apparatus. The extractor plate assembly of the invention comprises a suction chamber, a plurality of spaced holes on the lower surface of the suction chamber and means for moving the extractor plate between partly opened dies in the thermoforming machine for engaging and then removing the formed articles from the dies of the thermoforming machine. The suction system permits the application of suction sufficient to engage and hold the formed article while controlling the amount of suction to prevent collapse of thin walled articles.

BACKGROUND OF INVENTION

Apparatus for the production of thin walled plastic articles by deep drawing thermoplastic or light material in foil or strip form are known in the art. See, for example, U.S. Pat. No. 3,161,915 patented Dec. 22, 1964. In a thermoforming apparatus the article, once formed, is extracted from the dies of the thermoforming apparatus either using mechanical means or by applying a negative pressure to engage the articles. The mechanical means are not completely satisfactory in that the mechanism is normally quite complex and slower in operation than desired in a commercial machine. A transfer mechanism for applying a negative pressure to formed articles is disclosed in the aforesaid U.S. Pat. No. 3,161,915. The transfer mechanism comprises a carriage bearing on its underside a porous plate with a vacuum chamber above the porous plate. In operation, vacuum is maintained on the plate by means of a control valve to engage formed articles as best shown in FIG. 19 of the '915 patent. As shown, a vacuum is applied to the base or bottom of the article being formed. The dies of the thermoforming apparatus are then fully separated and the extractor plate carries the formed articles to a discharge conveyor or the like. This device is not completely acceptable in that the formed articles are disengaged from the extractor plate by releasing vacuum in the suction chamber. This takes time and, accordingly, is a limiting factor in the speed of operation of the machine.

U.S. Pat. No. 4,560,339 issued Dec. 24, 1985 describes a thermoforming apparatus in which articles are formed and cut in one unit and are extracted from the unit utilizing an extractor comprising a movable plate having a vacuum chamber similar to that shown in U.S. Pat. No. 3,161,915. However, in the '339 patent the lower face of the vacuum chamber, i.e., the face contacting articles to be removed, utilizes a plurality of inter-related channels and holes for applying adjustable suction and compression by connection to a vacuum and compressed air unit in order to extract the articles being formed from the recesses of the dies and to transfer then to an article stacker. The unit disclosed in the '339 patent again has disadvantages. Thus, U.S. Pat. No. 4,872,826, assigned to the assignee of the '339 patent and having the same inventor, in reference to the British equivalent of United States patent, states that the negative pressure used to extract the articles is brought about in accordance with the known art by adjusting the suction and shutting it off upstream of the suction holes provided on the extractor. It is stated that it is essential to have an optimum seal between the article formed and the plate. In addition, it is further stated that it has proved particularly difficult to obtain low negative pressures using the known art.

Adjustment and shutting off of the suction upstream of the suction holes in the extractor plate, again as stated in the '826 patent, does not cause formed articles to adhere to the extractor plate by means of air suction. Thus, the suction must be increased in order to draw the formed articles towards the extractor plate, with the result being that when the formed articles impact upon the extractor plate a considerable negative pressure is created within the articles, which is prejudicial to the integrity of the thin walls of the article.

The invention of the '826 patent, as stated therein, provides an apparatus for obtaining a negative pressure in formed articles and a flat extractor plate supporting the formed articles. The apparatus comprises a flat extractor plate for engaging formed articles which when resting their rims on the flat surface of the extractor plate form chambers, wherein a suction unit is connected with the formed chamber, by means of a pipe and a connecting cavity and wherein a vacuum shut-off valve is provided and an air intake adjustment valve is inserted between the suction source and the shut-off valve, and wherein each chamber is provided with at least one intake for atmospheric air into the chambers.

Although U.S. Pat. No. 4,872,826 describes a device which proportedly solves the problem associated with the device of U.S. Pat. No. 4,560,339 the device is complex in the requirement for a plurality of inter-related channels and holes. As is apparent from the '826 patent, particularly FIGS. 1–3, a hole must be positioned substantially in the center of a channel with that hole being substantially centered in the article formed by the thermoforming apparatus to form a chamber. Moreover, the use of a separate air intake adjustment valve in conjunction with the suction unit adds complexity and cost to the overall device.

Accordingly, there is a need for an improved extractor plate for removing thin walled articles from the dies of a thermoforming apparatus which permits control over the amount of suction so as to not collapse the articles, and which permits rapid release of the formed articles once the extractor plate is out of engagement with the dies of the thermoforming machine.

SUMMARY OF INVENTION

The present invention utilizes a vacuum unit similar to the vacuum unit disclosed in U.S. Pat. No. 3,161,915. However, in the vacuum unit of the present invention the lower plate of the vacuum chamber, i.e., the face which engages the articles which are to be removed from the thermoforming dies, has a plurality of spaced holes in the face which will engage articles formed in the thermoforming apparatus. It is not essential, however, that these holes be in any predetermined pattern in relation to the articles being formed and, accordingly, the extractor plate assembly can be used without modification for extracting articles of dissimilar size, configuration or design. Moreover, the unit permits the control of the pressure within the vacuum chamber in order to avoid having a collapse of formed articles as a result of too much pressure being provided.

According to the invention a pressure control valve is provided at the inlet side of a vacuum source with a vent valve between the pressure control unit and the vacuum source. The vent valve, being on the inlet side of the vacuum source and between the vacuum source and pressure control valve, allows a higher initial vacuum to develop in the vacuum plate before the plates make contact. Slightly before contact, the vent valve is closed, allowing the vacuum to return to the controlled pressure. The operation of the vent valve relative to the pressure control valve is controlled by delay relay connected to a platen circuit or by a PLC computer program.

As an additional feature of the present invention, the same vacuum chamber is utilized to apply air pressure into the vacuum chamber once the extractor plate is retracted from within the dies of the thermoforming apparatus so as to quickly release the articles, enhancing the speed of the operation. Thus, the vacuum is shut off from the vacuum chamber prior to the application of air pressure to reduce the volume to be filled with air. The vacuum and air pressure, therefore, are only separately applied.

THE DRAWINGS AND DETAILED DESCRIPTION

Having described the invention in general terms, a presently preferred embodiment will be described in reference to the drawings wherein:

FIG. 1 is a plan view of an extractor assembly for use in a thermoforming machine.

FIG. 2 is a view taken along line 2—2 of FIG. 1.

FIG. 3 is an enlarged view taken along line 3—3 of FIG. 1.

FIG. 4 is a plan view showing in detail a portion of the extractor plate assembly of FIG. 1 and showing schematically the vacuum and air pressure system of the extractor plate assembly.

FIG. 5 is a view taken along line 5—5 of FIG. 4 showing greater detail of the vacuum chamber and manifold system of the extractor plate assembly.

FIG. 10 illustrates the sequence of operation of the thermoforming extractor assembly controlled by a PLC computer.

Figure 6:
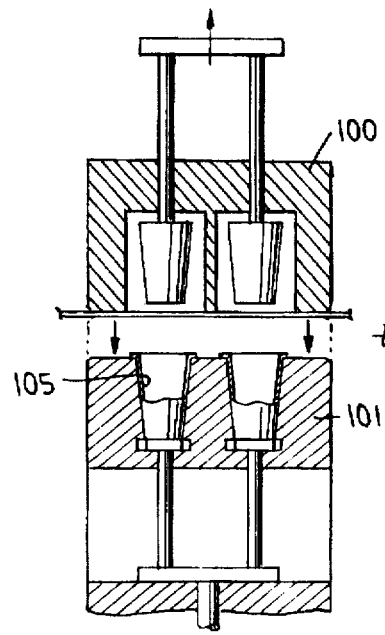
FIG. 6 is a fragmatic view of two dies only of a thermoforming machine wherein the dies are parted a distance sufficient to permit the extractor plate of the present invention to be inserted.

Referring first primarily to FIGS. 1-3, there is shown a movable extractor plate 10 carried on frame 30. Frame 30 includes four stationary posts 32 and two side panels 34 and 36. As illustrated in FIGS. 1-5, extractor plate 10 is fully extended into a thermoforming apparatus, not shown. Plate 10 moves into and out of the thermoforming apparatus by assembly 38, best shown in FIGS. 1-3, by linear bearings 40 and 42 carried on shafts 46 and 48. Linear bearing 40 carried on shaft 46 is driven by endless belt 50 attached thereto by belt clamp 52. Belt 50 is supported by shaft 49 and idler pulley 51, and driven by electric motor M. Belt 50 reverses itself when it reaches each end of the shaft.

The extractor plate 10, best shown in FIGS. 1, 4 and 5, comprises extractor top plate 12 which does not contain holes, extractor bottom plate 14 which has a plurality of spaced holes 15, with plates 12 and 14 together forming vacuum chamber 16. The extractor plate is reinforced along its inward edge only leaving the entire internal area free of obstructions as best illustrated in FIG. 4.

Extractor plate 10 is connected by a reinforced suction hose 50, which extends and contracts onto itself as the extractor plate is moved into and out of the thermoforming machine by assembly 38, to a vacuum system. The vacuum system, as diagrammatically shown in FIG. 4, includes a vacuum pump 54, and at the inlet side of the vacuum pump 54 a vent valve 56 and a pressure control valve 58. As shown in FIGS. 1 and 2, the preferred embodiment uses a combined vacuum pressure control and vent valve 57. The vacuum pressure is controlled in the range of 6 to 12 inches of water depending on the resistance of the formed article to collapse. The vacuum system includes a silencer 59.

The purpose of the vent valve 56 is to allow a higher initial vacuum to develop in the vacuum plate, as above stated, before the articles being thermoformed make contact with the extractor plate. Slightly before contact, vent valve 56 will be closed, allowing the vacuum to return to the controlled pressure regulated by pressure control valve 58. The operation of the vent valve is controlled by a delay relay connected to a platen circuit or by a PLC computer program.

As best shown in FIGS. 4 and 5, the vacuum chamber 16 is connected by manifold 53 through butterfly valve 55 to flexible hose 50. The butterfly valve is either in the open or closed position. It is not adjustable. As also shown in FIG. 4, the system includes a flexible air pressure line 70 having an opening and closing valve 74 for injecting air into vacuum chamber 16. In operation, however, air pressure is never applied unless and until the vacuum source is closed off from vacuum chamber 16 through butterfly valve 55.

Thus, as best shown in FIGS. 4 and 5, the manifold 53 is connected to flexible hose 50 through a plurality of holes 17. Additionally, air is allowed to enter into vacuum chamber 16 through a plurality of air nozzles 72 from air manifold 75 extending along the first or leading edge of extractor plate 10. This arrangement alternatively permits the application of a controlled vacuum to create a negative pressure for holding the articles formed in the thermoforming machine onto the extractor plate, with that pressure adjusted through pressure control valve 58 and vent valve 56 to avoid having excess pressure which could cause the article to collapse, and the application of air pressure into manifold 75 and vacuum chamber 16 once the vacuum is discontinued by closing butterfly valve 55. This latter feature permits the formed articles to be quickly removed from the extractor plate, shortening the overall cycle of the operation.

The device is simple in construction and does not require channels and holes in the bottom plate of the extractor or to have the holes placed in a pre-determined position depending upon the articles being made as required in U.S. Pat. Nos. 4,560,339 and 4,872,826.

The sequence of operation is shown in FIGS. 10. Steps 1 through 17 are conventional to any thermoforming operation. Steps 8–17 relate to the operation of the thermoforming machine with the extractor plate assembly of the present invention. As shown, the sequence of operation in the extractor assembly stage, is such that pressure control valve 58 delivers vacuum only during the time that air pressure from line 70 is off, i.e., steps 10–14, and conversely air pressure is applied only when butterfly valve 55 is closed, i.e., steps 15 and 16. Closing of valve 55 limits the volume to be filled by air pressure, increasing the speed of operation.

Figure 7:
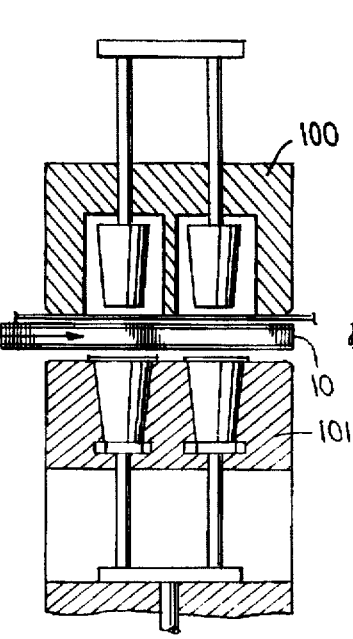
FIG. 7 is the same view as shown in FIG. 6 with the extractor plate inserted between the dies.
Figure 8:
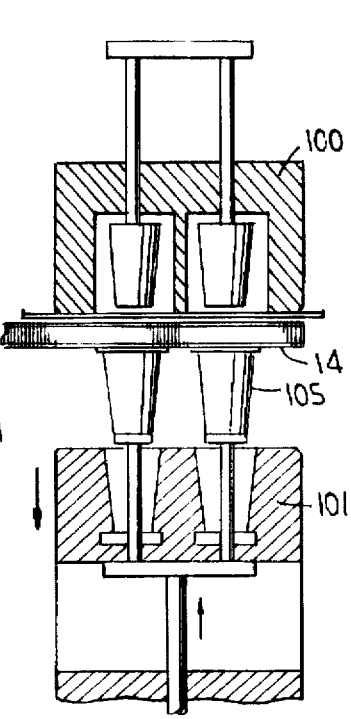
FIG. 8 is the same view as in FIG. 7 except that the articles formed in the dies are in engagement with the movable extractor plate, and the dies are being opened further.
Figure 9:
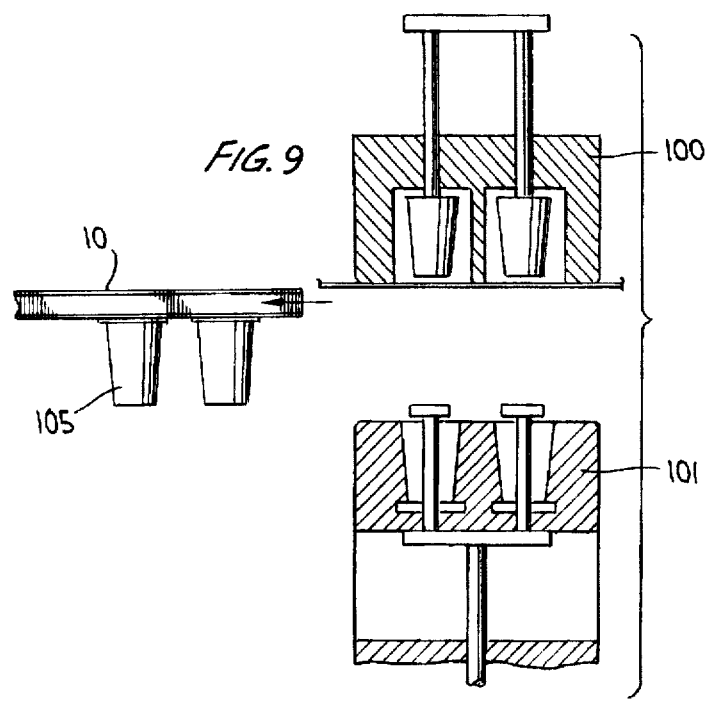
FIG. 9 is a view similar to FIG. 8 but with the dies fully opened and the movable extractor plate carrying the formed articles moving out from between the dies for disengagement from the plate.

Referring now to FIGS. 6-9, it is seen first in FIG. 6 that die parts 100 and 101, after forming articles 105, i.e., steps 1-7 of FIG. 10, are separated sufficiently to permit extractor plate 10 to enter between the die parts 100 and 101 as shown in FIG. 7 corresponding to step 8 of FIG. 10. Suction is applied to the suction chamber as shown in FIG. 8 to cause the articles 105 to engage the bottom 14 of the extractor plate, with the die parts further opening. As seen in FIG. 9, when the dies are fully extended, plate 10 is retracted from between the die parts for discharge of articles into a suitable receptacle, not shown. The article receptacle will preferably be contained within frame 30 of the assembly.

In FIGS. 6-9 only two dies are shown, however, in a preferred commercial device, up to about 32 or more dies are utilized to form up to about 32 articles simultaneously. Moreover, various modifications will be recognized by those skilled in the art based on the present teaching. Thus, although only select preferred embodiments have been specifically illustrated and described herein, it is to be understood that various modifications and embodiments can be utilized in the extractor plate assembly herein described. For example, it is possible to use modified means for moving the extractor plate into and out of position in the thermoforming apparatus. Further, modifications can be made in the valving, either at the opening and closable butterfly valve or in the mechanism used to provide air into the vacuum chamber, these modifications being capable of being made without departing from the spirit of the invention are to be included within the scope of the appended claims.

It is claimed:

1. In combination, a thermoforming apparatus comprising a plurality of dies for forming a plurality of thin walled plastic articles and a movable extractor plate assembly for moving an extractor plate between said plurality of dies for removal of said plurality of articles from said dies of said thermoforming apparatus, said extractor plate assembly comprising a flat extractor plate having first and second edges and comprising a non-porous top plate, and a bottom plate having a plurality of spaced holes, said top and bottom plates forming a suction chamber there between, first manifold means at said first edge of said extractor plate interconnected to said suction chamber and connected to one end of an extendable and contractible first hose means, said first hose means connected at a second end to an outlet end of a vacuum source, said vacuum source connected at an inlet end to a pressure control valve and a vent valve between said pressure control valve and said inlet end of said vacuum source, suction in said suction chamber being controlled by said pressure control valve and vent valve to engage and hold a plurality of articles formed in said thermoforming apparatus without deforming said articles, and said extractor plate assembly including means for moving said extractor plate into and out from between said plurality of dies in said thermoforming apparatus.

2. The combination of claim 1 wherein said extractor plate includes a second manifold means at said first edge connected to an air pressure source through a flexible second hose means and inter-connected to said vacuum chamber through a plurality of air jets in said second manifold means, said first hose means at the end connected to said manifold including first valve means to open and close said vacuum in said vacuum chamber and said assembly including control means to coordinate the closing of said first valve means to said vacuum source and opening said air jets to provide air to said vacuum chamber.

3. The combination of claim 1 or 2 wherein said means for moving said extractor plate into and out of said plurality of dies in said thermoforming apparatus include movable linear bearings carried by shafts and driven by an endless belt.

* * * * *